UNITED STATES PATENT OFFICE.

WALTER F. SMITH, OF PHILADELPHIA, PENNSYLVANIA, ASSIGNOR TO THE ELECTRIC STORAGE BATTERY COMPANY, OF GLOUCESTER CITY, NEW JERSEY.

METHOD OF MAKING SUPPORTS FOR ELECTRODES OF SECONDARY BATTERIES.

SPECIFICATION forming part of Letters Patent No. 416,126, dated November 26, 1889.

Application filed September 10, 1889. Serial No. 323,543. (No model.)

*To all whom it may concern:*

Be it known that I, WALTER F. SMITH, a citizen of the United States, residing at the city of Philadelphia, in the county of Philadelphia and State of Pennsylvania, have invented certain new and useful Improvements in the Process for the Formation of Frames or Supports for the Plates or Elements of Electric Batteries, &c., of which the following is a specification.

Heretofore the plates or elements of secondary batteries or electro-chemical accumulators have generally been supported in frames composed of lead; but when lead alone was used the frames or supports invariably became oxidized, corroded, or partially formed into an objectionable peroxide during the formation of the spongy material of the plates or elements, and such peroxide continued to form upon the frames or supports during the charging and discharging of the battery, and finally disintegrating or falling off in particles or flakes, thereby causing local action to set in and the battery to be short-circuited.

The principal object of my invention is to provide a comparatively inexpensive and durable composition of matter of good electrical conductivity for frames or supports for the plates or elements of secondary batteries or electro-chemical accumulators, and for forming the connecting devices for coupling one battery with another, and such a material or composition as will prevent injurious oxidation or partial formation of the frames or supports during the charging and discharging of the battery and local action setting in, and thereby causing short-circuiting of the same.

My invention consists of the method of making an amalgam by placing in a suitable electrolyte an anode of lead and a cathode of mercury and causing an electric current to pass through the same, then removing the anodes and cathodes and washing and straining off any surplus mercury, whereby the amalgam is brought to a plastic condition of the consistency of putty for use.

My invention further consists in the method of incorporating the amalgam produced substantially in the manner described with a metallic material to become cast into a frame for supporting a battery plate or element, or a device for connecting one battery with another.

A convenient method of carrying my invention into effect is as follows: A certain quantity of mercury (Hg) is made the cathode of a cell and metallic lead (Pb) the anode in a suitable dilute solution, as nitrate of lead, to constitute the electrolyte thereof. A current of electricity is then caused to pass through the electrolytic cell and the ensuing electrolysis allowed to continue until the mercury has saturated or permeated a large proportion of the lead. The amalgam thus formed is then placed in a suitable straining appliance and the nitrate of lead removed by washing and the excess of mercury strained off, thereby leaving the mass in a plastic condition suitable for combining with molten lead or other material for various uses in connection with electric batteries.

The amalgam of lead may be prepared by fusing the lead and then introducing a certain percentage, by weight, of mercury into the same and allowing the fused mass to cool and then washing and treating the compound as above, or in any other preferred manner.

The amalgam as above described, introduced preferably into the material while in a molten state—that is, to form the frame or support of the battery plate or element, or a device for connecting one battery with another battery or batteries—is then poured into a mold of the preferred construction to become cast to, between, or around the plate or structure composed of active material, or material to become active for use as a battery element; or the said mass or compound may be cast into a device to serve the purpose of connecting one battery with another, as will be quite well understood by those skilled in the art to which my invention appertains without any further description.

In practice it has been found that four (4) per cent. (more or less) of the amalgam introduced into the lead before casting the compound or mixture into frames or supports gives excellent results and prevents the injurious oxidation or partial formation on the frames or supports of an objectionable peroxide, as above mentioned, during the stages said frames or supports necessarily undergo in the forming of the plates or elements of the battery. Then in practice the conductivity and durability of devices for connecting one battery with another are materially enhanced and excellent results obtained by the forming of such devices of the aforesaid composition.

The above-described compound may be made by first fusing the lead and then introducing the mercury into the mass; but when this is done an appreciable quantity of the mercury is volatilized or lost before becoming incorporated with the lead, and, moreover, in any event the exact quantity of the mercury combining or becoming incorporated with the lead is uncertain; hence preference is given in the production of the composition to making the amalgam first in any preferred manner and then causing the same to become incorporated or combined with the lead.

Having thus described the nature and objects of my invention, what I claim as new, and desire to secure by Letters Patent, is—

1. The method of making an amalgam for the formation of the frames, &c., of an electric battery, which consists in mounting in an electrolyte an anode of a metal and a cathode of mercury and causing an electric current to pass through the same, then removing the anodes and cathodes and washing and straining off any surplus mercury, whereby the amalgam is brought to a plastic condition for use.

2. The method of making frames to support the plates or elements of an electric battery, which consists in mounting in an electrolyte an anode of lead and a cathode of mercury and causing an electric current to pass through the same, then removing the anodes and cathodes and straining off any surplus mercury, then incorporating the amalgam with a metallic material and casting the mass, substantially as and for the purposes set forth.

In witness whereof I have hereunto set my signature in the presence of two subscribing witnesses.

WALTER F. SMITH.

Witnesses:
GEO. W. REED,
HERMANN BORMANN.